Dec. 4, 1951  H. J. ROOSDORP  2,577,483
SELF-COMPENSATING MEASURING BRIDGE CIRCUIT
HAVING AUTOMATIC CONTROL AND/OR ALARM
Filed Feb. 1, 1947  2 SHEETS—SHEET 1

H. J. ROOSDORP
INVENTOR
BY
AGENT

UNITED STATES PATENT OFFICE 2,577,483

SELF-COMPENSATING MEASURING BRIDGE CIRCUIT HAVING AUTOMATIC CONTROL AND/OR ALARM

Hermanus Joannes Roosdorp, Eindhoven, Netherlands, assignor to Hartford National Bank and Trust Company, Hartford, Conn., as trustee Application February 1, 1947, Serial No. 725,776
In the Netherlands February 2, 1946

6 Claims. (Cl. 171—95)

In Wheatstone measuring bridges it is known that bridge equilibrium may be automatically adjusted by a mechanical force, for example by an electric motor, which under the influence of current or voltage in the bridge branch, causes the sliding contact of a potentiometer to move in one sense or the other until equilibrium is established. If the magnitude to be measured has attained an inordinate value, this mechanical control force may be used at the same time to readjust the said magnitude and/or to produce an alarm signal. The object of the invention is to provide a device by which this effect is accomplished in a simple manner. More specifically, it is an object of the invention to stabilize the means for readjusting said magnitude without in any way affecting the position of the sliding contact of the potentiometer in the bridge circuit.

The invention resides in an arrangement wherein together with the indicating or recording part of the apparatus a contact is moved along a conductor having a potential variation such that, if the said contact passes one or more predetermined positions, control and/or alarm ensues.

This conductor is preferably interrupted at at least one point, its parts having different potentials. In this case the conductor may, as an endless belt having two interruptions, be arranged on two guide rollers having different potentials.

As an alternative, the contact may be caused to slide along a current-conveying resistance, the varying voltages between this contact and one or more contacts which do not follow the movement of the indicating part and are adjustable along the resistance, being used for control and/or alarm purposes.

Figure 1:
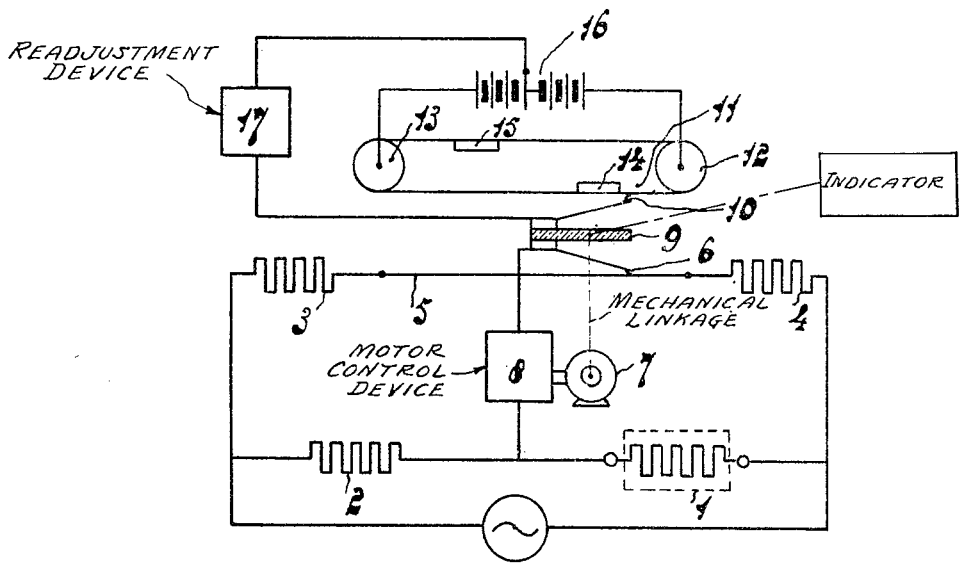
Figure 2:
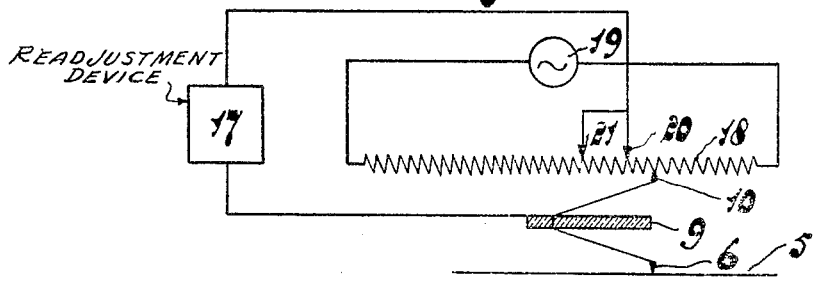
Figure 3:
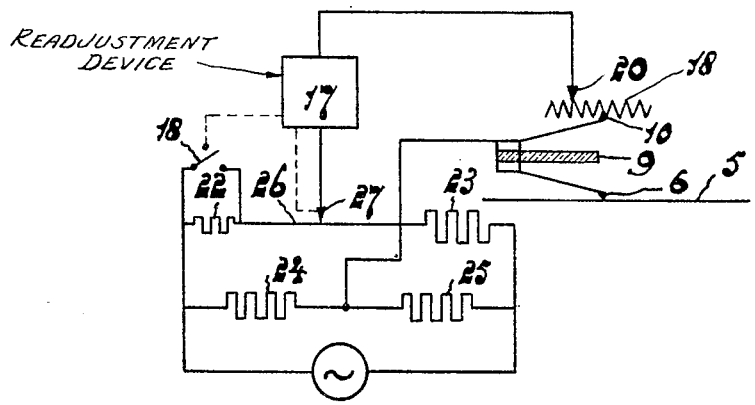
Figure 4:
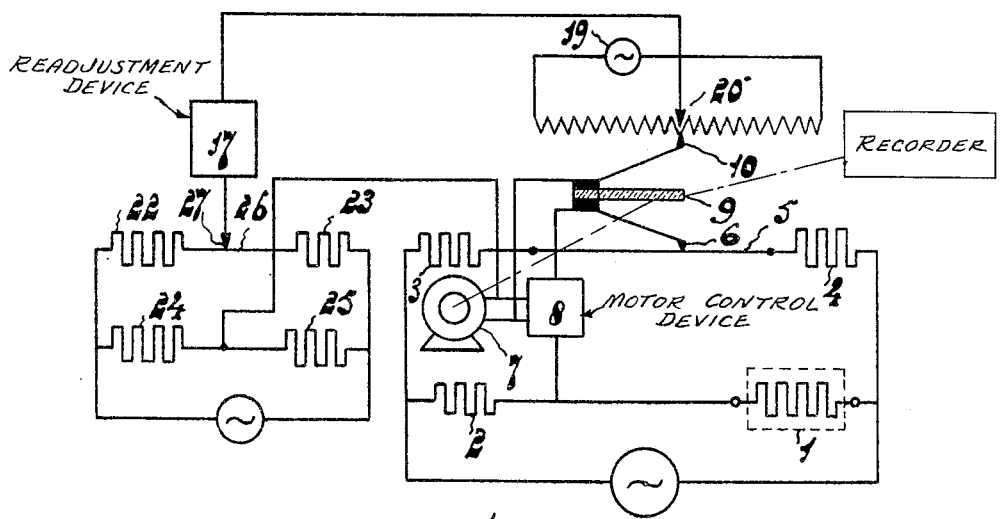

The invention will be explained more fully with reference to the accompanying drawing, in which Figs. 1 and 2 represent, by way of example, two embodiments of the invention whereas Figs. 3 and 4 show two variants of the embodiment in Fig. 2.

In the embodiment shown in Fig. 1 the magnitude to be measured, for example the resistance element 1 of a resistance thermometer, is included in one of the branches of a Wheatstone bridge, the other branches of which are formed by resistances 2, 3 and 4 and by a measuring wire 5 extending between 3 and 4 and along which a contact 6 may be moved to and fro by an electric motor 7. The latter is driven by current from a device 8 which is controlled by the current of the bridge which is located in between the contact 6 and the junction of the resistances 1 and 2. The device 8 does not form part of the invention and is therefore not further described hereinafter. Any of the devices known for this purpose may be used.

The contact 6 is resiliently secured to an insulator 9, which is moved to and fro by the motor 7 together with the indicating or recording part (not shown) of the apparatus. This insulator is provided with a second resilient contact 10, which moves along a conductive endless belt 11. This belt is arranged on two guide rollers 12 and 13 and interrupted at two diametrical points 14 and 15. The spindles of the rollers 12 and 13 are connected to the terminals of a battery 16, the centre of which is connected through a device 17 to the contact 10. Consequently, if contact 10, on sliding along the belt 11, passes the interruption 14, the current in the device 17 reverses in sense, the device 17 being arranged in one of the manners known for the purpose so as to bring about, as a result of this reversal of current, either readjustment of the magnitude to be measured (for example, temperature), or an alarm signal or both of them.

The point of the interruption 14 may be chosen at will by turning the rollers 12 and 13, it being possible, if desired, for the point of interruption as well as the position of contact 9 to be made visible on the same indicator.

In the embodiment shown in Fig. 2 the device 11—15 is replaced by a resistance 18, which is fed by a source, for example a power line, with alternating current. In this case direct-current supply is, however, also possible.

In addition to the contact 10, two contacts 20 and 21 are slidable along the resistance 18, which contacts are connected to one another and to one terminal of the device 17, the other terminal of which is connected to contact 10. Thus, the device 17 is traversed by a current of an intensity and phase (or sense) which are dependent on the position of contact 10 relatively to the contacts 20 and 21, which current may be utilized for readjustment and/or for alarm purposes as soon as the contact is moved to a point corresponding with an undue value of the magnitude to be controlled. The use of two interconnected contacts 20 and 21 affords a degree of "backlash," since during the time in which contact 10 traverses the spacing between 20 and 21, variation in the current flowing through the device 17 does not occur. However, if no backlash is desired, contact 21 may be dispensed with.

When using the device shown in Fig. 2 it is possible to stabilize the automatic readjustment by means of feed-back without the position of the measuring potentiometer 5, 6 being affected by this feed-back, since this can be ensured, according to the invention, by connecting in series with the readjusting adjusting device 17 the diagonal voltage of an auxiliary bridge, the equilibrium conditions of which vary under the influence of the movements of the readjusting member in such manner that these movements are counteracted thereby. This is diagrammatically shown, by way of example, in Fig. 3.

This figure is entirely identical to that of Fig. 2, except that an auxiliary measuring bridge is included between the device 17 and the contact 10, said bridge being constituted by four resistances 22, 23, 24, 25 and a potentiometer 26 having a sliding contact 27. This contact is moved, under the action of the control movement in the device, in such manner that the said control movement is counteracted, which is possible since this control movement takes place under the influence of the sum of the voltage between contacts 10 and 20 and the voltage set up at the diagonal of the auxiliary bridge, of which the sliding contact 27 is one of the terminals.

In this device the indication of the measuring instrument remains correct. Only the position of the point of control changes owing to the fact that contact 27 is shifted. If this is considered as a disadvantage, use may be made of a resilient feed-back coupling instead of a fixed feed-back coupling as described, in which event the equilibrium of the auxiliary bridge is disturbed only temporarily, namely during the movement of the control member 17, for example, owing to the fact that during this time one of the resistances 22 or 23 is heated and hence increases in value. In this case contact 27 may be chosen to be fixed.

The sensitiveness of the readjustment may be reduced in the device shown in Fig. 3 by providing that at the moment at which the control pulse is given, that is when contact 10 passes contact 20, the equilibrium of the auxiliary bridge is disturbed in such a sense that the resulting diagonal voltage supports the voltage between contacts 10 and 20. It is thus avoided that the moving parts start clacking about the position of equilibrium. If, owing to the readjustment, contact 10 subsequently returns again, this return movement will continue until the voltage between the contacts 10 and 20 exactly compensates for that of the diagonal of the auxiliary bridge. Not until then will a new control pulse be given, but now in the opposite sense, if the movement of contact 10 continues.

The equilibrium of the auxiliary bridge may be disturbed under the action of the control pulse by short-circuiting one of the bridge resistances, for example 22, by means of a switch 28.

If a great constancy of adjustment is desired, in other words, if it is desired that the control device 17 should become operative almost immediately after the indicating device begins to leave the desired point of adjustment, use may be made of the variant shown in Fig. 4.

In this case the device 17 has series-connected to it not only the auxiliary bridge shown in Fig. 3, but also a voltage derived from the motor 7. The pulse required for starting the adjustment will, in this case, be given as soon as the motor 7 is supplied with current, which will take place under the action of the apparatus 8 as soon as the equilibrium of the main bridge is disturbed.

What I claim is:

1. A self-compensating measuring system comprising a measuring bridge circuit constituted by first and second parallel branches, the value of the first branch varying in accordance with the magnitude to be measured, the second branch having a movable contact therein to balance the bridge circuit, means to apply an energizing voltage as an input across said branches, means to derive an output voltage from said measuring bridge circuit between a fixed point in said first branch and said movable contact in said second branch, a control mechanism responsive to a voltage proportional to said output voltage and arranged to shift said contact to a position in said second branch establishing bridge balance for the magnitude being measured whereby the relative position of said contact provides an index to said magnitude, a readjustment device to be actuated when said contact passes beyond a predetermined position in said second branch, and means for actuating said device comprising means to develop a control voltage in accordance with the discrepancy between said predetermined position and the position assumed by said contact in said second branch, an auxiliary bridge circuit having input terminals connected to an energizing voltage source and output terminals, means to apply the voltage developed across said output terminals in series with said control voltage to said readjustment device, and means to disturb the equilibrium of said auxiliary bridge circuit to an extent in accordance with the degree of unbalance of said measuring bridge circuit beyond said predetermined position.

2. A self-compensating measuring system comprising a measuring bridge circuit constituted by first and second parallel branches, the value of the first branch varying in accordance with the magnitude to be measured, the second branch having a movable contact therein to balance the bridge circuit, means to apply an energizing voltage as an input across said branches, means to derive an output voltage from said measuring bridge circuit between a fixed point in said first branch and said movable contact in said second branch, a control mechanism responsive to a voltage proportional to said output voltage and arranged to shift said contact to a position in said second branch establishing bridge balance for the magnitude being measured whereby the relative position of said contact provides an index to said magnitude, a readjustment device to be actuated when said contact passes beyond a predetermined position in said second branch, and means for actuating said device comprising a potentiometer connected to a voltage source and having a fixed tap and a movable tap, said movable tap being mechanically coupled to the movable contact in said measuring bridge circuit, said fixed tap being disposed at a point in said potentiometer at which the control voltage established between said fixed and movable taps is proportional to the discrepancy between said predetermined position and the position assumed by said contact, an auxiliary bridge circuit having input terminals connected to an energizing voltage source and output terminals, means to apply the voltage developed across said output terminals in series with said control voltage to said readjustment device, and means to disturb the equilibrium of said auxiliary bridge circuit to an extent in accordance with the degree of unbalance of said measuring bridge circuit beyond said predetermined position.

3. A self-compensating measuring system comprising a measuring bridge circuit constituted by first and second parallel branches, the value of the first branch varying in accordance with the magnitude to be measured, the second branch having a movable contact therein to balance the bridge circuit, means to apply an energizing voltage as an input across said branches, means to derive an output voltage from said measuring bridge circuit between a fixed point in said first branch and said movable contact in said second branch, a control mechanism responsive to a voltage proportional to said output voltage and arranged to shift said contact to a position in said second branch establishing bridge balance for the magnitude being measured whereby the relative position of said contact provides an index to said magnitude, a readjustment device to be actuated when said contact passes beyond a predetermined position in said second branch, and means for actuating said device comprising a potentiometer connected to a voltage source and having a fixed tap and a movable tap, said movable tap being mechanically coupled to the movable contact in said measuring bridge circuit, said fixed tap being disposed at a point in said potentiometer at which the control voltage established between said fixed and movable taps is proportional to the discrepancy between said predetermined position and the position assumed by said contact, an auxiliary bridge circuit constituted by two parallel branches and having input terminals connected to an energizing source and output terminals connected between a fixed point in one of said branches and a movable contact in the other of said branches, means to apply the voltage developed across said output terminals in series with said control voltage to said readjustment device, and means to mechanically couple the movable contact of said auxiliary bridge circuit to said readjustment device whereby the equilibrium of said auxiliary bridge circuit is disturbed to an extent in accordance with the degree of unbalance of said measuring bridge circuit by the magnitude being measured beyond said predetermined position.

4. An arrangement as set forth in claim 3 further including a shorting switch connected across a portion of said other branch of said auxiliary bridge circuit, and means responsive to the actuation of said readjustment device to close said switch.

5. A self-compensating measuring system comprising a measuring bridge circuit constituted by first and second parallel branches, the value of the first branch varying in accordance with the magnitude to be measured, the second branch having a movable contact therein to balance the bridge circuit, means to apply an energizing voltage as an input across said branches, means to derive an output voltage from said measuring bridge circuit between a fixed point in said first branch and said movable contact in said second branch, a control mechanism responsive to a voltage proportional to said output voltage and arranged to shift said contact to a position in said second branch establishing bridge balance for the magnitude being measured whereby the relative position of said contact provides an index to said magnitude, a readjustment device to be actuated when said contact passes beyond a predetermined position in said second branch, and means for actuating said device comprising a potentiometer connected to a voltage source and having a fixed tap and a movable tap, said movable tap being mechanically coupled to the movable contact in said measuring bridge circuit, said fixed tap being disposed at a point in said potentiometer at which the control voltage established between said fixed and movable taps is proportional to the discrepancy between said predetermined position and the position assumed by said contact, an auxiliary bridge circuit constituted by two parallel branches and having input terminals connected to an energizing source and output terminals connected between a fixed point in one of said branches and a fixed point in the other of said branches, the value of one of said branches in the auxiliary bridge circuit varying as the magnitude to be measured, and means to apply the voltage developed across said output terminals in series with said control voltage to said readjustment device to actuate same.

6. A self-compensating measuring system comprising a measuring bridge circuit constituted by first and second parallel branches, the value of the first branch varying in accordance with the magnitude to be measured, the second branch having a movable contact therein to balance the bridge circuit, means to apply an energizing voltage as an input across said branches, means to derive an output voltage from said measuring bridge circuit between a fixed point in said first branch and said movable contact in said second branch, a control mechanism responsive to a voltage proportional to said output voltage and arranged to shift said contact to a position in said second branch establishing bridge balance for the magnitude being measured whereby the relative position of said contact provides an index to said magnitude, a readjustment device to be actuated when said contact passes beyond a predetermined position in said second branch, and means for actuating said device comprising a potentiometer connected to a voltage source and having a fixed tap and a movable tap, said movable tap being mechanically coupled to the movable contact in said measuring bridge circuit, said fixed tap being disposed at a point in said potentiometer at which the control voltage established between said fixed and movable taps is proportional to the discrepancy between said predetermined position and the position assumed by said contact, an auxiliary bridge circuit constituted by two parallel branches and having input terminals connected to an energizing source and output terminals connected between a fixed point in one of said branches and a movable contact in the other of said branches, means to apply the voltage developed across said output terminals in series with said control voltage and said voltage proportional to the output voltage of said measuring bridge circuit to said readjustment device, and means to mechanically couple the movable contact of said auxiliary bridge circuit to said readjustment device whereby the equilibrium of said auxiliary bridge circuit is disturbed to an extent in accordance with the degree of unbalance of said measuring bridge circuit beyond said predetermined position.

HERMANUS JOANNES ROOSDORP.

REFERENCES CITED

The following references are of record in the file of this patent:

UNITED STATES PATENTS

| Number | Name | Date |
| --- | --- | --- |
| 2,256,304 | Wills | Sept. 16, 1941 |
| 2,363,336 | Keeler | Nov. 21, 1944 |